United States Patent [19]
Soehnle et al.

[11] 3,866,699
[45] Feb. 18, 1975

[54] PERSONNEL SCALE APPARATUS

[75] Inventors: Karl Soehnle, Murrhardt; Richard Scheerer, Murrhardt-Harbach; Klaus Gutzy, Murrhardt; Rido Busse, Oberelchingen; Reinhold Rapp, Ulm/Donau, all of Germany

[73] Assignee: Murrhardter Waagenfabrik Gebr. Soehnle, Murrhardt, Germany

[22] Filed: Sept. 21, 1973

[21] Appl. No.: 399,507

[30] Foreign Application Priority Data
Feb. 17, 1973 Germany............................ 2307879

[52] U.S. Cl. ................................. 177/34, 177/245
[51] Int. Cl. ...................... G01g 19/04, G01g 23/00
[58] Field of Search .................. 177/34, 40, 245, 25

[56] References Cited
UNITED STATES PATENTS
2,836,980  6/1958  Glepen............................ 177/245 X
2,913,238  11/1959  Tommervik........................... 177/25
3,655,003  4/1972  Yamajima....................... 177/245 X Primary Examiner—George H. Miller, Jr.
Attorney, Agent, or Firm—Michael S. Striker

[57] ABSTRACT

A scale has a platform for a person to be weighed, and an indicator which shows the actual weight of the person on a dial while indicating the magnitude of deviation of the actually determined weight from the ideal weights associated with respective different body heights.

23 Claims, 11 Drawing Figures

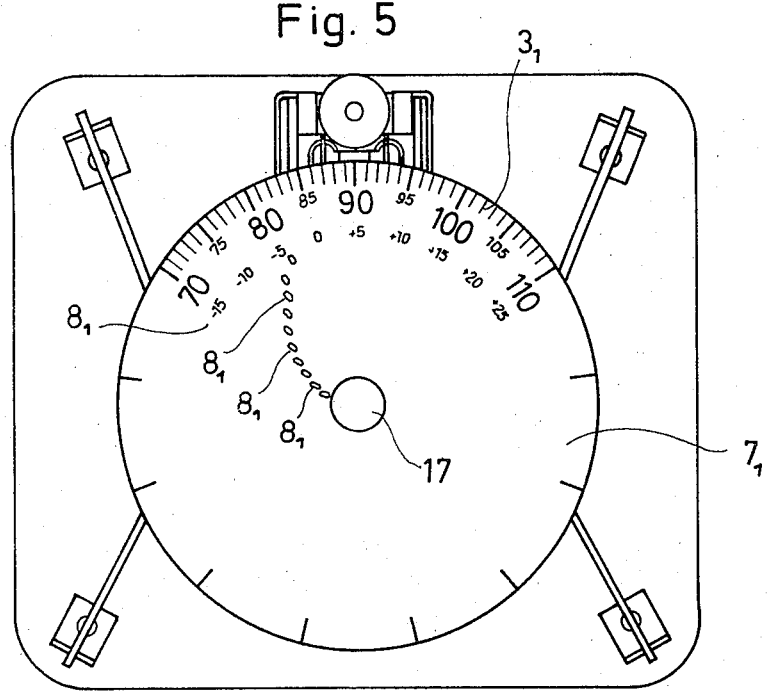
Fig. 5
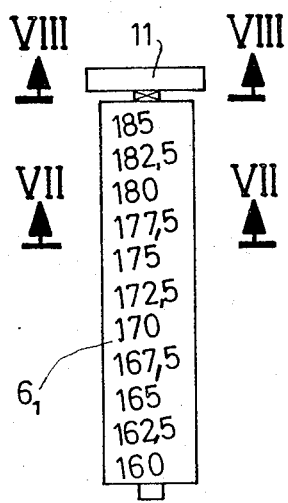
Fig. 6
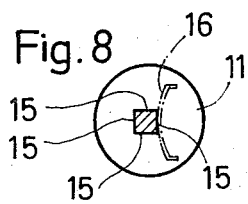
Fig. 8
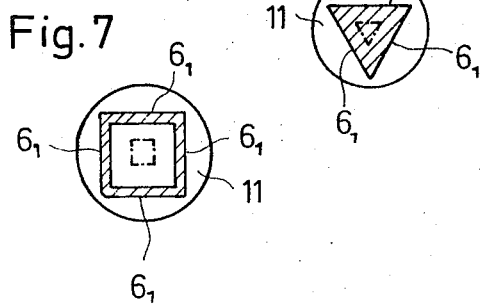
Fig. 7
Fig. 9

PERSONNEL SCALE APPARATUS

BACKGROUND OF THE INVENTION

The present invention relates generally to scale apparatus, and more particularly to a personnel scale apparatus.

Still more particularly, the invention relates to a personnel scale apparatus which indicates the actual weight of the person and compares it at the same time with the optimum or ideal weight which depends upon the height of the person.

It is already known from the art to provide a personnel scale of the general type in question which uses indicating lamps. These indicate the magnitude of deviation of the actually measured weight from the optimum or ideal weight, by being energized due to closing of contacts which are associated with a body-height scale that can be set by the user and by the scale which indicates the actual measured weight. It is inherent in this prior-art construction that the contact must be sliding contacts, and the friction which results during such sliding tends to influence and falsify the weight indication. Moreover, the manufacturing and installation difficulties for the slidable contacts with their various conductors are significant, resulting in high manufacturing expense. The contacts tend to corrode and to wear, especially because such scales are usually used in relatively humid locations such as public baths, shower rooms and the like, and this also disadvantageously influences the batteries which are usually employed to energize the lamps. Aside from this, the inaccuracies observed in the operation of this prior-art scale are at times very substantial.

SUMMARY OF THE INVENTION

It is, accordingly, an object of the present invention to provide an improved personnel scale apparatus which does not have the disadvantages of the prior art.

More particularly it is an object of the present invention to provide such an improved personnel scale apparatus which provides in a simple manner an indication of the precise relationship between the actual measured body weight and the ideal body weight, at the time that weighing takes place and without requiring any separate calculations or complicated manipulations on the part of the user.

Another object of the invention is to provide such a personnel scale apparatus which is simple in its construction and reliable in its operation.

Still a further object of the invention is to provide such a personnel scale apparatus which affords a high degree of accuracy in its weight indications.

Still another object of the invention is to provide such a personnel scale apparatus which requires little or no maintenance.

In keeping with these objects, and with others which will become apparent hereafter, one feature of the invention resides in a personnel scale apparatus which, briefly stated, comprises a first means for determining the actual weight of a person, and second means for indicating different body heights. Third means is provided for indicating for each body height the ideal weight which is desirable. Fourth means indicates the actually determined weight as well as the magnitude of deviation of the actually determined weight from the ideal weights associated with the respective different body heights.

The term "personnel scale apparatus" as employed herein is intended to refer to a scale which is used for weighing persons, rather than the type of scale used for weighing objects.

The second means for indicating different body heights may use a single body height scale or, even more advantageously, it may use two of them. It is well known from standard actuarial tables that the ideal weight in dependence upon the body height is different for men and for women, so that it is preferable to have one scale indicating the body height of men and another scale indicating the body height of women. Moreover, the ideal or optimum weight according to actuarial tables depends not only upon the body height and the sex of a person, but also upon the age and the body characteristics of the person, that is whether a person has a large or small frame structure, etc. It is therefore advantageous that at least one of the body height scales be replaceable or exchangeable. Such exchanging can be simplified if several body height scales are provided on at least one turnably mounted prism, so that the respective scale can be selected merely by turning the prism to a requisite extent. The prism may be provided with a handle or a projection a portion of which may extend outwardly beyond the platform on which a user stands.

It is advantageous if two prisms are provided, being spaced from one another and extending parallel to the scale indicating the actual weight, and to the other scales being located above the latter, so that all scales to be read can be readily viewed with a single glance. The arrangement is particularly easily viewable if the respectively applicable body height scale extends approximately normal to that portion of the actual weight scale which is visible in a viewing window of the apparatus, and if the other scales extend parallel to the actual weight scale and concentric thereto.

It is further advantageous in terms of simplifying the reading-off of the results, if a shield is provided which covers all but one of the scales other than the actual weight scale and the body height scale. The shield is advantageously configurated as a turnable plate having windows which are angularly spaced and so arranged that only one of these windows will at any time be in registry with the window through which the results on the actual weight scale can be viewed. This turnable shield is arranged coaxially with reference to the actual weight scale which is configurated as a dial and above which the shield is located.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 5 is a view of the embodiment in FIG. 3 with other portions omitted for the sake of clarity;

FIG. 6 is an enlarged-scale view of a prism for use with the novel scale apparatus, the prism being provided with a body height scale;

FIG. 7 is a section taken on line VII—VII of FIG. 6;

FIG. 8 is a section taken on line VIII—VIII of FIG. 6;

FIG. 9 is a section corresponding to the section VII—VII of FIG. 6, but taken through a prism according to a further embodiment of the invention;

DESCRIPTION OF THE PREFERRED EMBODIMENTS

Figure 1:
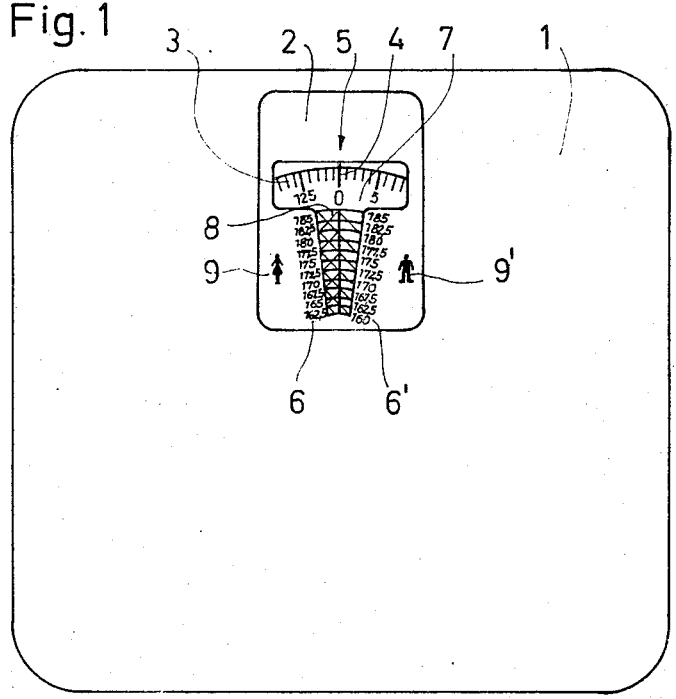
FIG. 1 is a top-plan view of a personnel scale according to the present invention.
Figure 2:
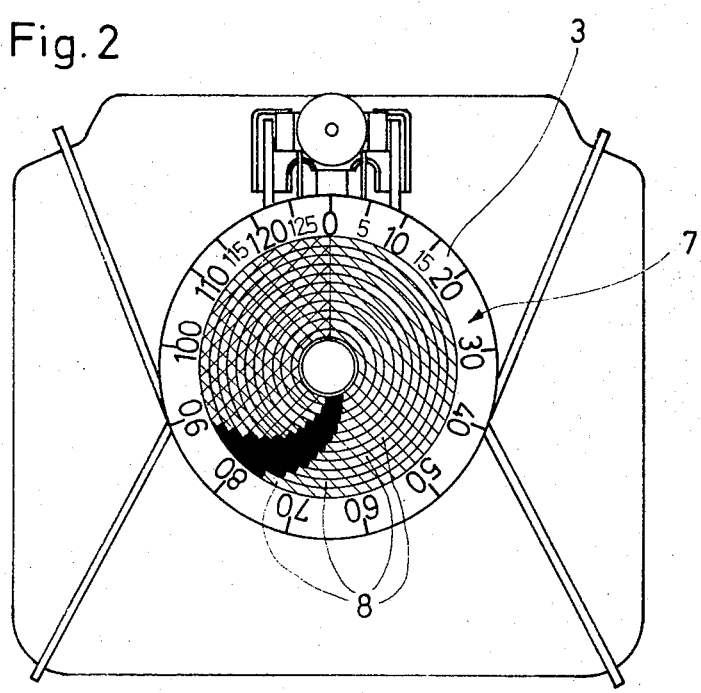
FIG. 2 is a view identical with that of FIG. 1, except that the body-supporting platform has been removed for the sake of clarity.
Figure 3:
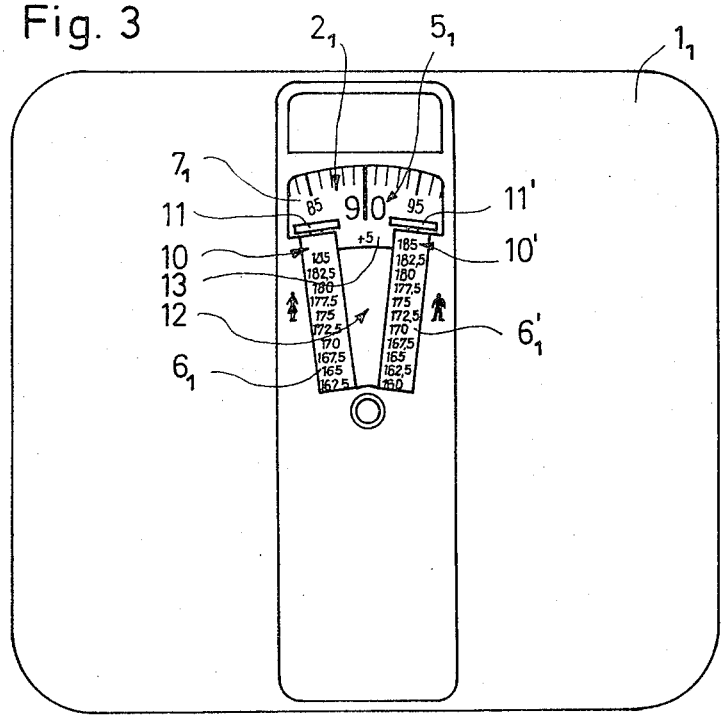
FIG. 3 is a view similar to FIG. 1 but illustrating a further embodiment of the invention.
Figure 4:
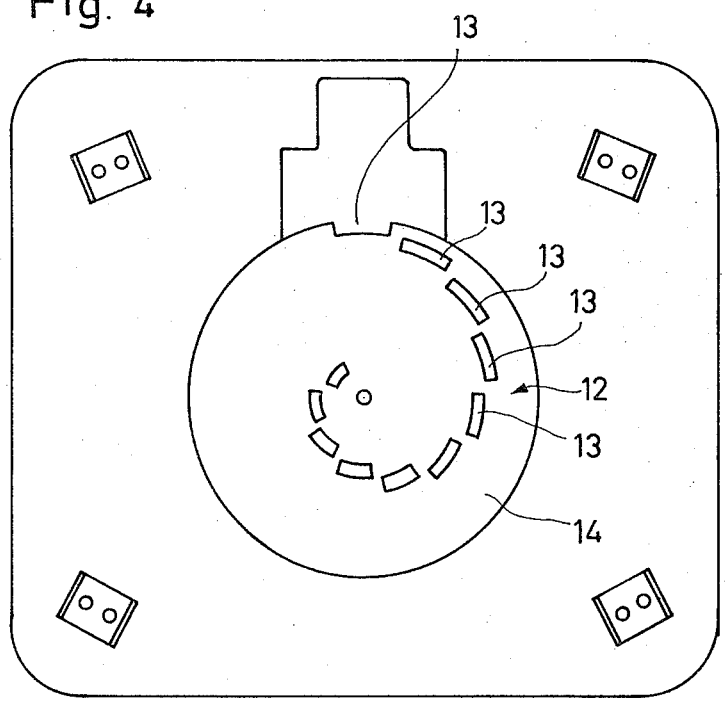
FIG. 4 is a bottom-plan view of the body-supporting scale of the embodiment in FIG. 3, with portions omitted for the sake of clarity.

Referring firstly to the embodiment in FIGS. 1 and 2 it will be seen that reference numeral 1 identifies a body-supporting platform or plate which is provided with a window 2. The latter may have a transparent glass or plastic panel extending across it and an actual-weight indication 5 becomes visible in the window 2 when a person is supported on the platform 1. The weight indication is provided by an actual-weight scale 3 and an indicator 4. Also provided beneath the platform 1 are two spaced body height scales 6, 6'. The scale 3 is provided in the marginal zone of a disc 7 on which there are provided concentric additional scales 8 which are associated with the individual regions of the body height scales 6, 6'. The body height scale 6 has associated with it a stylized female figure 9, and the body height scale 6' has associated with it a stylized male figure 9', to indicate that the scale 6 provides body heights of women and the scale 6' provides body heights of men.

The scales 8 are color scales. Thus, in the region of ±2.5 kg from the optimum or ideal weight there may be provided a green indication, the regions above 2.5 kg in excess of the ideal weight may be marked in different shades of red, with each shade for instance covering 5 kg overweight, and the region below the 2.5 kg underweight may be subdividied into sections of 5 kg each, with the different sections being marked in different shades of yellow. Evidently, other colors can be used, and the various section can be further subdivided.

The body height scales 6, 6' are so spaced from one another on the platform 1 that the window 2 permits viewing of each scale 8 over a range which may cover for instance between 5 and 10 kg.

FIGS. 3–9 show somewhat different arrangements according to the invention. It will be seen that the platform is here identified with reference numeral $1_1$ in which two prisms 10, 10' are turnably journalled, each carrying one of the scales $6_1$ and $6_1$, which represent body heights for men and women, respectively. Each of the prisms 10, 10' can be turned via a handle or engaging portion 11, 11', respectively, which is configurated in a disc-like manner in this embodiment and a portion of which extends through the window $2_1$ to permit turning of the prisms 10, 10' which may be of quadratic cross section as shown in FIG. 7, or of triangular cross section as shown in FIG. 9. The scales $6_1$ and $6_1'$ on the respective prisms 10, 10' may be further subdivided so that each prism carries on its different surfaces different of the scales $6_1$ or $6_1'$, respectively, with the different scales taking into account different age or different bodily structure.

To facilitate the reading-off of the deviation of the actual measured rate from the optimum or ideal weight associated with a particular body height, which optimum or ideal weight is to be found on the scale $8_1$ of the disc $7_1$ of the weight indication $5_1$, a shield 12 with windows 13 is provided intermediate the disc $7_1$ and the prisms 10, 10'. The shield 12 is here configurated as a plate or disc 14 which is turnable and arranged concentric with reference to the disc $7_1$. A knob 17 is provided which permits turning of the disc 14 and the windows 13 are so arranged that only one of the windows 13 is visible between the prisms 10, 10' and permits viewing only of the scale $8_1$ associated with the particular body height. The scales $8_1$ are so provided on the disc $7_1$ that, in dependence upon the optimum or ideal weight associated with the particular body height the weight deviations of the actual weight from the ideal weight are indicated in steps of 5 kg each by numerals, as shown in FIG. 5. Again, color gradations may be provided on the scale $8_1$ to make it even more readily legible.

Unintentional turning of the prisms 10, 10' is prevented by providiing the same with a number of abutment surfaces 15 corresponding to the number of body height scales 6 or 6', which abutment surfaces 15 cooperate with a detent spring 16 as shown in FIG. 8.

It is of course well known that different human races have different optimum weights in dependence upon their different body heights. To take this into account (if, for instance, the scale is to be shipped to different parts of the world) and to facilitate and simplify the manufacture of the scale, it is advantageous if the body height scales 6, 6' can be so provided on the platform 1 that they can be readily exchanged for others. In this manner it is, incidentally, also possible to readily adapt the scale for variables, for instance to replace body height scales for men and women with body height scales for boys and girls if the scale is to be used exclusively in an environment where the latter type of scale is needed, for instance in a school or the like.

Figure 10:
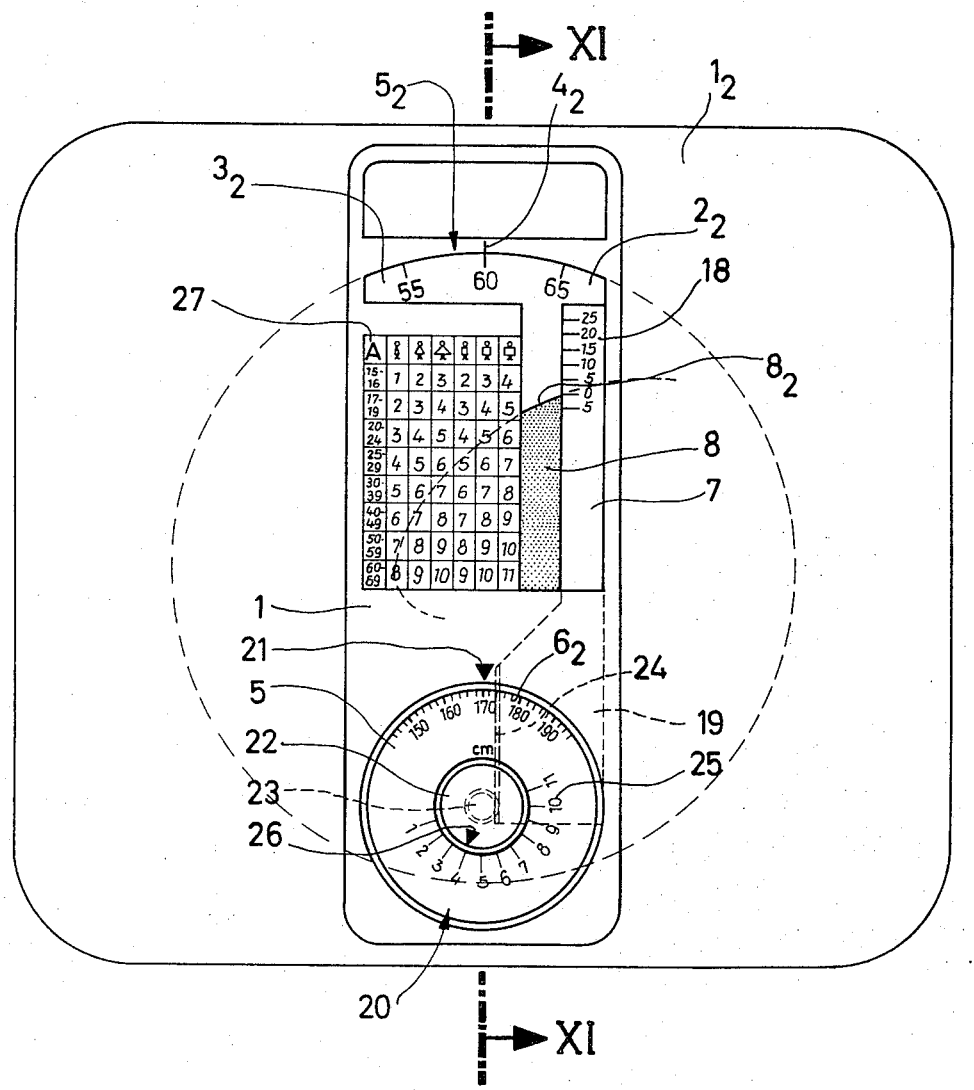
FIG. 10 is a plan view of a further embodiment of the invention.
Figure 11:
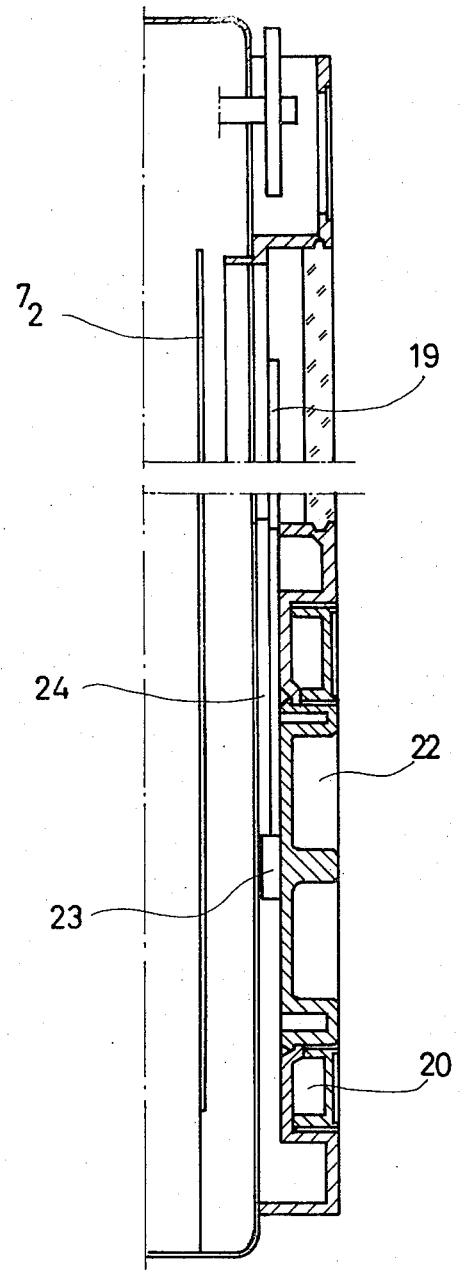
FIG. 11 is a section corresponding to the line XI—XI of FIG. 10, but illustrating a slightly different embodiment.

FIGS. 10 and 11, finally, show a further embodiment and a slight modification thereof. The platform is here identified with reference numeral $1_2$ and an actual weight scale $3_2$ is viewable through window $2_2$. The scale $3_2$ cooperates with an indicator $4_2$ to provide a rate indication $5_2$.

The actual weight scale $3_2$ is provided on a disc $7_2$ which is also provided with an additional scale $8_2$ in form of a spiral track which cooperates with a scale 18 on which the deviation of the actual weight from the optimum or ideal weight per body height can be read. The scale 18 is provided on a slide 19 which is displaceable in the platform $1_2$. The slide 19 can be displaced in dependence upon the body height by means of a wheel 20 with a body height scale $6_2$ which cooperates with an indicator 21 on the platform $1_2$. A knob 22 is turnably mounted in the wheel 20 and has a portion provided with a pinion 23 which engages with a rack 24 of the slide 19 to shift the same when the knob 22 is turned. A scale 25 is provided on the wheel 20 which permits setting of an indication 26 of the knob 22.

The particular key number to be set on the scale 25 is selected from a table 27 which is provided on the platform 1₂ and which lists the key numbers in dependence upon the age, the sex and the type of body structure of a person. FIG. 10 shows, for instance, that the key number 4 is set, in which case the scale apparatus indicates that at a body height of 1.70 meters and a weight of 60 kg the deviation of the actual measured weight from the ideal or optimum weight is 0 kg, that is that the two weights coincide. With this arrangement any deviations can be determined rapidly and without requiring any calculations.

FIG. 11 differs from FIG. 10 only in that the knob 22 and the wheel 20 are of slightly different shape. In all other respects it corresponds to FIG. 10 so that a more detailed description of FIG. 11 is not believed to be necessary except to point out that reference character B1 designates brake means e.g. friction ring means, which is interposed between and cooperates with the knob 22 and the wheel 20, while reference character B2 designates brake means interposed between and cooperating with the user platform and the wheel 20 and providing a braking force greater than that furnished by the brake B1.

It will be understood that each of the elements described above, or two or more together, may also find a useful application in other types of constructions differing from the types described above.

While the invention has been illustrated and described as embodied in a personnel scale apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A personnel scale apparatus, comprising first means for determining the actual weight of a person; second means for indicating different body heights, including a body-height scale and two prisms which are spaced from said body-height scale and from one another and which extend in parallelism with said body-height scale; third means for indicating for each body height the ideal weight which is desirable; and fourth means for indicating the actually determined weight as well as the magnitude of deviation of the actually determined weight from the ideal weights associated with respective different body heights.

2. A personnel scale apparatus, comprising first-means for determining the actual weight of a person; second means for indicating different body heights comprising a pair of body-height scales; third means for indicating for each body height the ideal weight which is desirable; fourth means, comprising a weighing scale and an indicator for the same, for indicating the actually determined weight as well as the magnitude of deviation of the actually determined weight from the ideal weights associated with respective different body heights; a window through which portions of said body-height scales and of said fourth means are visible; and superimposed parallel slides each provided with one of said body-height scales and each selectively slidable relative to said window so as to permit viewing of the respective body-height scale therein.

3. A personnel scale apparatus as defined in claim 2, wherein said slides are mounted at opposite lateral sides of said window for the sliding movement relative thereto.

4. A personnel scale apparatus, comprising first means for determining the actual weight of a person; second means for indicating different body heights, comprising a turnable prism having different sides, and a plurality of body-height scales, one on each of said sides; third means for indicating for each body height the ideal weight which is desirable; and fourth means for indicating the actually determined weight as well as the magnitude of deviation of the actually determined weight from the ideal weights associated with respective different body heights.

5. A personnel scale apparatus as defined in claim 4, said scale having a body-supporting weighing platform; and said prism including a handle projecting outwardly beyond said platform for engagement by a user.

6. A personnel scale apparatus as defined in claim 4, said prism having a plurality of angularly spaced abutments; and further comprising a detent spring arranged to yieldingly engage the respective abutments in response to turning of said prism.

7. A personnel scale apparatus, comprising first means for determining the actual weight of a person; second means for indicating different body heights, comprising a pair of body-height scales; third means for indicating for each body height the ideal weight which is desirable; fourth means comprising a weighing scale and an indicator for the same, for indicating the actually determined weight as well as the magnitude of deviation of the actually determined weight from the ideal weights associated with respective different body heights, and a housing provided with a window of substantially V-shaped outline through which portions of said first through fourth means are visible.

8. A personnel scale apparatus as defined in claim 7, wherein at least one of said body height scales is exchangeable for another.

9. A personnel scale apparatus as defined in claim 7, said third means comprising ideal-weight scales having ideal scale portions which provide indications of different ideal weights.

10. A personnel scale apparatus, comprising first means for determining the actual weight of a person; second means for indicating different body heights; third means for indicating for each body height the ideal weight which is desirable, comprising a plurality of ideal-weight scales, and a shield for shielding all but one of said ideal-weight scales from viewing at any one time; and fourth means for indicating the actually determined weight as well as the magnitude of deviation of the actually determined weight from the ideal weights associated with respective different body heights.

11. A personnel scale apparatus as defined in claim 10, wherein said shield is a turnable shield having cutouts for viewing said ideal-weight scales; said scale apparatus having a housing provided with a window for viewing the indications of said fourth means, and said cut-outs being so arranged that only one of them can move into registry with said window at any one time.

12. A personnel scale apparatus as defined in claim 11, said fourth means including a dial-shaped actual-weight scale; and said shield being a turnable disc located above said actual-weight scale and having a knob for engagement by a user so as to permit turning of said shield.

13. A personnel scale apparatus comprising first means for determining the actual weight of a person; second means for indicating different body heights; third means for indicating for each body height the ideal weight which is desirable; and fourth means for indicating the actually determined weight as well as the magnitude of deviation of the actually determined weight from the ideal weights associated with respective different body heights, said fourth means comprising an actual-weight scale of dial-shaped configuration, and a further scale associated with said actual-weight scale and displaceable relative to said actual-weight scale in dependence upon height, sex and body type of a scale user so as to provide in conjunction with said actual-weight scale an indication of the deviations of the actually determined weight from the ideal weights associated with said height, sex and body type.

14. A personnel scale apparatus as defined in claim 13, wherein said further scale is provided on a slide member which is slidably mounted for said displacement.

15. A personnel scale apparatus as defined in claim 14, said apparatus further having a window through which portions of said actual-weight scale and said further scale are viewable; and wherein said slide member is displaceable transversely to such portions of said actual-weight scale which are viewable in said window.

16. A personnel scale apparatus as defined in claim 15; further comprising a handwheel associated with said slide member for displacing the same, and wherein said second means comprises a body-height scale and an indicator cooperating with the same in response to turning of said handwheel.

17. A personnel scale apparatus as defined in claim 16, wherein said handwheel is connected with a pinion which turns in unison with said handwheel; and wherein said slide member comprises a rack which engages with said pinion.

18. A personnel scale apparatus as defined in claim 17; and further comprising a turnable knob connected with said slide member for displacing the same independently of the operation of said handwheel.

19. A personnel scale apparatus as defined in claim 18, further comprising a table which provides key numbers indicative of the relative setting to be effected between said handwheel and said knob in dependence upon age, sex and bodily structure of a user, said knob being provided with a pointer, and said handwheel having a scale of said key numbers and cooperating with said pointer.

20. A personnel scale apparatus as defined in claim 19, wherein said table is removably mounted on said apparatus so as to be exchangeable for a different table.

21. A personnel scale apparatus as defined in claim 18, wherein said turnable knob is provided on said handwheel; and wherein said knob connects said handwheel and said pinion.

22. A personnel scale apparatus as defined in claim 21; and further comprising brake means interposed between and cooperating with said turnable knob and said handwheel.

23. A personnel scale apparatus as defined in claim 22; further comprising a platform for supporting a user of the apparatus; and an additional brake interposed between said platform and said handwheel which is provided thereon, said additional brake providing a braking force greater than that of the first-mentioned brake.

* * * * *